Sept. 25, 1962 P. A. COOK ET AL 3,055,055
RUNNER HEATER FOR INJECTION MOLDING MACHINES
Filed Oct. 15, 1959 2 Sheets-Sheet 1

INVENTORS
PERCY ALBERT COOK
ARTHUR JACK JAMES
BERT TAYLOR
BY Maybee & Legris
ATTORNEYS

INVENTORS
PERCY ALBERT COOK
ARTHUR JACK JAMES
BERT TAYLOR

BY: Maybee & Legris
ATTORNEYS

3,055,055
RUNNER HEATER FOR INJECTION MOLDING MACHINES

Percy Albert Cook, Toronto, Ontario, and Arthur Jack James and Bert Taylor, Downsview, Ontario, Canada, assignors, by mesne assignments, to Cardinal Enterprises Limited, Toronto, Ontario, Canada
Filed Oct. 15, 1959, Ser. No. 846,589
6 Claims. (Cl. 18—30)

Conventional cold-runner molding techniques require the use of at least a three-part mold when molding hollow articles such as cups from thermo-plastic materials, the three parts being comprised by a front plate carrying the male members of the mold, an intermediate plate formed with the female cavities defining the outer surface of the article to be molded, and a runner plate having runner cavities connected to a common supply aperture and to which plasticized molding material is supplied under a considerable pressure so that the material will flow along the runner cavities and into the respective cavities of the intermediate plate when the mold is in an assembled condition.

The disadvantage of molds of this form is that in addition to molding articles within the cavities defined by the female cavities and male mold members a runner and sprue is also molded within the runner cavities. It is therefore necessary to open each of the three parts of the mold after each molding "shot" to enable the molded articles to be removed and also to enable the solidified runner and sprue to be removed.

This disadvantage seriously militates against automation, and to overcome the problem it has been proposed to heat the runner plate so that the plasticized molding material contained within the runner cavities is always maintained at its plastic temperature, thus obviating the necessity of separating the runner plate from the intermediate plate after each molding operation. Also, as the articles molded are not attached to a solidified runner or sprue they can be easily removed from the mold by automatic devices without separating the intermediate and runner plate.

In molds at present in use and embodying heated runner plates it is necessary to heat the whole of the runner plate to an even temperature, and this gives rise to problems. The runner plate adequately must be insulated from its supporting structure and from the intermediate plate comprising the female mold to avoid excessive heat loss from the runner plate; difficulties are encountered in sealing the runners to avoid seepage of the plasticized molding material and consequential wastage; elaborate precautions have to be taken to ensure that no localized hot spots occur in the runner plate, which hot spots can result in burning of the plasticized material; the heat gradient across the runner plate very closely must be kept at a constant to avoid the possibility of certain ones of the runners reaching a temperature higher than that of others of the runners, with a consequential unevenness of flow rate of the plasticized molding material into the mold cavities; the heat loss from the runner plate depends to a great extent on atmospheric temperature and humidity, and therefore the heat applied to the runner plate must be very carefully controlled in dependence on ambient conditions; and, very careful structural design is required to ensure that the runner plate does not become thermally or mechanically distorted.

A major problem in the construction of such hot runner molds has been the maintenance of a constant temperature gradient across the runner plate, and, in order to provide the necessary constant heat gradient it has been found necessary to provide intricate lattice works of heating elements and to selectively control determined ones of those elements. This, however, renders the structural design of the runner plates even more complex, for, due to the varied mechanical cross-sections due to the accommodation of the heating elements it is found very difficult to control distortion of the runner plate.

The object of the present invention is to provide extremely simple and inexpensive heating means for the runner cavities of such a runner plate, and by means of which the above outlined disadvantages are mitigated or eliminated.

According to the invention a heater for a runner cavity of a runner plate of an injection molding machine comprises a tubular heat-producing electrical element which is positioned directly within the runner cavity and which is of sufficient length for the element to extend substantially throughout the length of the runner cavity, the element being of a major transverse cross-section which is less than the complementary transverse cross-section of the runner cavity for the outer surface of the element to be spaced from the cavity defining walls to provide for the passage of plasticized molding material along the surface of said element.

The invention also contemplates a heated runner plate assembly for an injection molding machine, which runner plate assembly includes a runner plate having a plurality of runner cavities through which plasticized molding material is to be forced under pressure from a common supply aperture of the runner cavities to discharge apertures thereof, and a tubular heat-producing electrical element within each runner cavity and of sufficient length for the element to extend substantially throughout the length of the associated runner cavity, the element being of a major transverse cross-section less than the complementary transverse cross-section of the associated runner cavity for the outer surface of the element to be spaced from the cavity defining walls to provide for the passage of plasticized molding material along the surface of said element between said supply and discharge apertures.

In the case where the runner plate is provided by a backing plate and a facing plate arranged in intimate face to face contact, the runner cavity is preferably provided by a groove in one or both of the juxtaposed surfaces of the facing and backing plates and by a bore in the facing plate, the heater of the invention being positioned within the said groove.

Further objects and advantages of the present invention will become apparent from a study of the following specification when taken in conjunction with the accompanying drawings in which.

Figure 1:
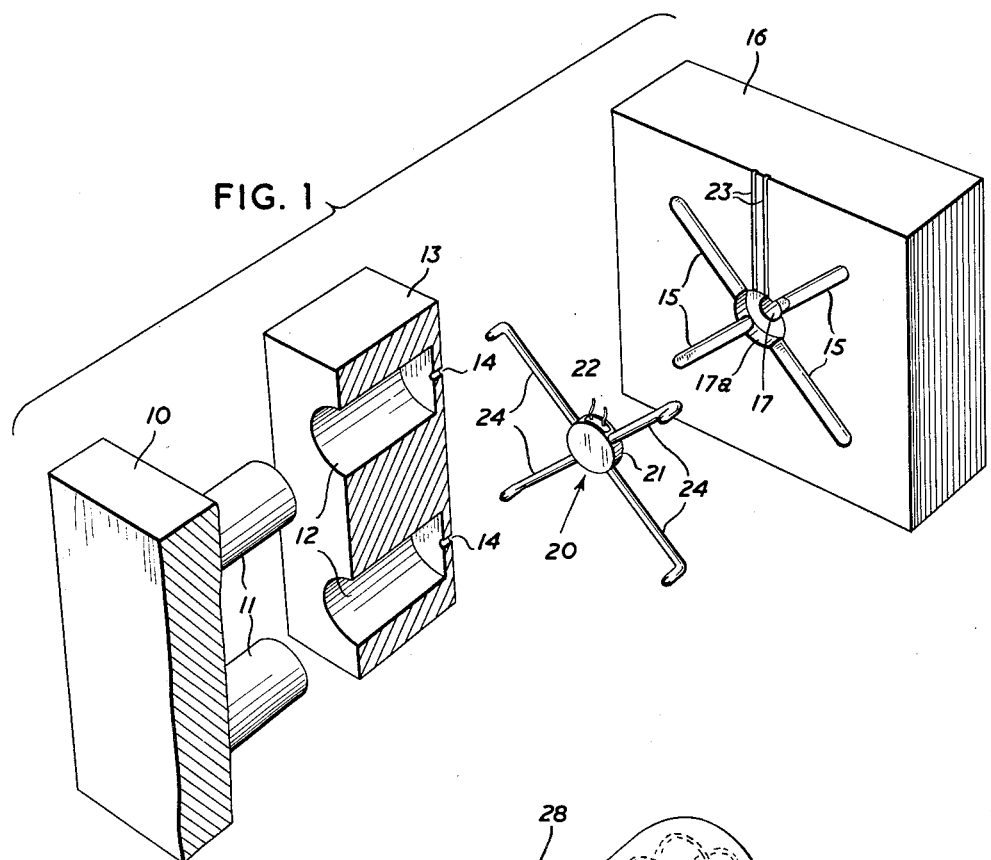
FIGURE 1 is an exploded fragmentary perspective view showing a very simple form of mold incorporating a heater and runner plate assembly according to the invention.

Referring first to FIGURE 1, the mold is shown as being a three-part mold comprised by a front plate 10 carrying a plurality of male members 11 of the mold, which male members are to be inserted within female cavities 12 of an intermediate plate 13 to provide the necessary article defining cavities. The ingress of plasticized molding material to the interior of the female cavities 12 is permitted by apertures 14 which communicate with runner cavities 15 of a runner plate 16, the plasticized molding material being supplied to the runner cavities 15 through a central common supply aperture 17.

Positioned within the runner cavities 15 and within a central aperture 17$^a$ providing an extension of the supply aperture 17 is the heater of the invention indicated generally at 20.

The heater 20 includes a connection box 21 which lies within the aperture 17$^a$ and which has a pair of electrical connections 22, which, when the heater is positioned within the runner cavities, extend through grooves 23 machined in the face of the runner plate 16.

Figure 2:
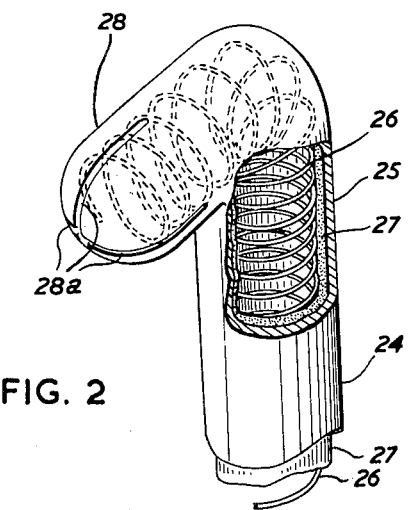
FIGURE 2 is a fragmentary perspective view showing the construction of the heater of the invention to a larger scale; and, FIGURE 3 is a diagrammatic cross-section through a runner plate assembly formed by a facing and backing plate and incorporating the heater of the invention.

Radiating from the junction box 21 is a plurality of arms 24, each comprising a heating element constructed as shown more clearly in FIGURE 2. The heating elements are each provided by a tubular metal sheathing 25 which houses an electrical resistance wire 26, the necessary electrical isolation between the resistance wire and the metal sheathing being provided by a filler 27 of ceramic, asbestos wool, or other suitable material. The electrical resistance wire may be connected to the metal sheathing at its end remote from the junction box for the metal sheathing to provide the necessary return circuit.

At the ends of each of the heating elements 24 remote from junction box 21 the sheathing 25 is turned substantially through a right angle for it to be axially aligned with the associated discharge aperture 14, and is formed with a hemispherical end surface 28. Each of the end surfaces 28 is provided with a pair of grooves 28$^a$ which intersect at the longitudinal axis of the sheathing and along which the plasticized molding material can flow into the associated aperture 14.

Figure 3:
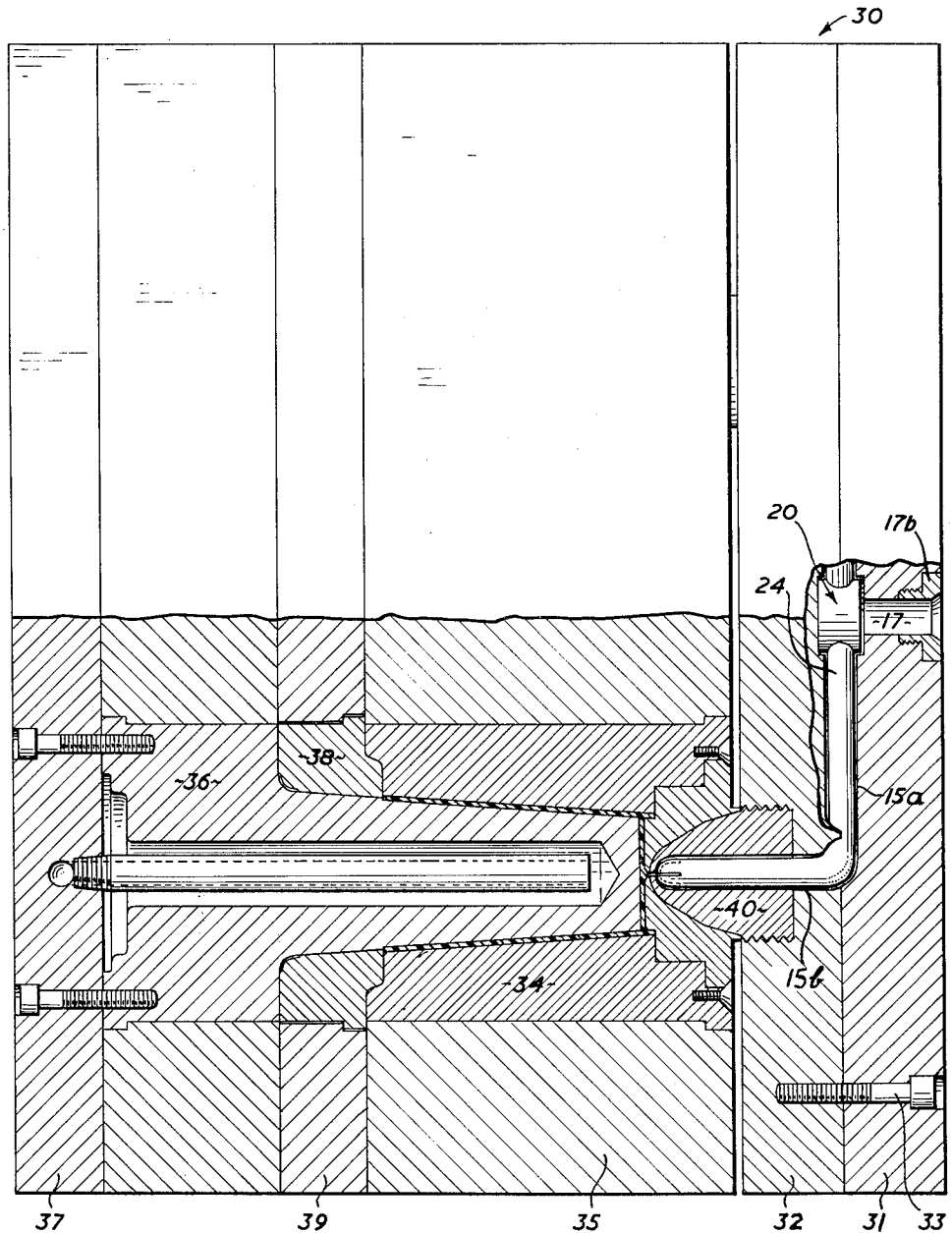

FIGURE 3 shows more completely a hot runner plate constructed according to the invention and incorporating the heating element of the invention. That construction includes a runner plate 30 in the form of a manifold comprised by backing plate 31 and a facing plate 32, the runner cavities 15 being provided by grooves 15$^a$ machined directly into the backing plate 31 and closed by the juxtaposed face of the facing plate 32, and by bores 15$^b$ machined in the facing plate 32. The backing and facing plates are held together by bolts 33, and conveniently the supply aperture 17 is provided with a wear resistant insert 17$^b$ for coaction with a supply nipple of a conventional plasticizing unit.

The female mold members in FIGURE 3 are comprised by a plurality of cup-shaped members 34 which are clamped directly onto the facing plate 32 by a clamping plate 35, the female mold member receiving male mold members 36 carried by a plate 37. The annular members 38 surrounding the male mold members are for the purpose of stripping molded articles from the male mold members and are carried by a plate 39.

The heater is indicated at 20, the arms each extending from the supply aperture 17 along the grooves 15$^a$ and through the bores 15$^b$ for their spherical ends to lie closely adjacent the nozzles 40, which nozzles are for charging plasticized molding material into the mold cavities.

As will be apparent, the heat loss from the runner plate assembly of the invention is far less than that with conventional heated runner plate structures, for the heat is supplied directly to the plasticized molding material which flows along the surface of the heating elements 24, which material acts to a degree as a thermo-insulation material. The runner plate may thus be at a temperature which is far lower than the plasticizing temperature of the plasticized molding material, and it is therefore unnecessary to provide any sealing devices for the electrical connections 22, or for the juxtaposed faces of the intermediate member 13 and runner plate 16, or for the juxtaposed faces of the backing and facing plates 31, 32, for any seepage of the plasticized molding material will "freeze" to form a very effective seal between those members.

Other problems such as distortion of the backing plate and insulation of the backing plate from its supporting structure are also greatly mitigated, and the electrical power requirements of the assembly are very greatly reduced.

What we claim as our invention is:

1. The combination of a runner plate assembly and a heating element for an injection molding machine, including a runner plate having a plurality of runner cavities through which plasticized molding material is to be forced under pressure from a common supply aperture of the runner cavities to discharge apertures thereof, and a tubular heat-producing electrical element within each runner cavity and of sufficient length for the element to extend substantially throughout the length of the associated runner cavity, the element being of a major transverse cross-section less than the complementary transverse cross-section of the associated runner cavity for the outer surface of the element to be spaced from the cavity defining walls to provide for the passage of plasticized molding material along the outer surface of said element.

2. The combination of a runner plate assembly and a heating element for an injection molding machine, including a runner plate having a plurality of runner cavities through which plasticized molding material is to be forced under pressure from a common supply aperture of the runner cavities to discharge apertures thereof, and a tubular heat-producing electrical element within each runner cavity and of sufficient length for the element to extend substantially throughout the length of the associated runner cavity, the element being of a major transverse cross-section less than the complementary transverse cross-section of the associated runner cavity for the outer surface of the element to be spaced from the cavity defining walls to provide for the passage of plasticized molding material along the outer surface of said element, one end of each heater terminating at the discharge aperture of the associated runner cavity in a hemispherical end surface overlying said discharge aperture, the hemispherical end surface including at least one groove which pass through the longitudinal axis of the heater and which extends over a minor portion of the length of the heater.

3. The combination of a runner plate assembly and a heating element for an injection molding machine, including a runner plate having a plurality of runner cavities through which plasticized molding material is to be forced under pressure from a common supply aperture of the runner cavities to discharge apertures thereof, and a tubular heat-producing electrical element within each runner cavity and of sufficient length for the element to extend substantially throughout the length of the associated runner cavity, the element being of a major transverse cross-section less than the complementary transverse cross-section of the runner cavity for the outer surface of the element to be spaced from the cavity defining walls to provide for the passage of plasticized molding material along the outer surface of said element, one end of each heater terminating at the discharge aperture of the associated runner cavity in a hemispherical end surface overlying said discharge aperture, the hemispherical end surface including at least one groove which passes through the longitudinal axis of the heater and which extends over a minor portion of the length of the heater, and a connection box secured to the element adjacent an opposite end thereof and positioned within the supply aperture of the runner cavity.

4. The combination of a runner plate assembly and a heating element for an injection molding machine, including a runner plate comprised by a backing plate and a facing plate arranged in intimate face contact, the runner plate having a plurality of runner cavities provided by grooves between the juxtaposed faces of the backing and facing plates, and having a common supply aperture in the backing plate through which plasticized molding material under pressure may be forced through the runner cavities and out through discharge apertures of the facing plate, and a tubular heat-producing electrical element within each runner cavity and of sufficient length for the element to extend substantially throughout the length of the associated runner cavity, the element being of a major transverse cross-section less than the complementary transverse cross-section of the associated runner cavity for the outer surface of the element to be spaced from the cavity defining walls and to provide for the passage of plasticized molding material along the outer surface of said element between said supply and discharge apertures.

5. The combination of a runner plate assembly and a heating element for an injection molding machine, including a runner plate comprised by a backing and a facing plate arranged in intimate face contact, the runner plate having a plurality of runner cavities provided by grooves between the juxtaposed faces of the backing and facing plates and bores in the facing plate connecting with said grooves, the runner cavities having a common supply aperture in the backing plate through which plasticized molding material under pressure may be forced through the runner cavities and out through discharge apertures of the facing plate, and a tubular heat-producing electrical element within each runner cavity and of sufficient length for the element to extend substantially throughout the length of the associated runner cavity, the element being of a major transverse cross-section less than the complementary transverse cross-section of the associated runner cavity for the outer surface of the element to be spaced from the cavity defining walls to provide for the passage of plasticized molding material along the outer surface of said element between said supply and discharge apertures, one end of each heater terminating at the discharge aperture of the associated runner cavity in a hemispherical end surface overlying said discharge aperture, the hemispherical end surface including at least one groove which passes through the longitudinal axis of the heater and which extends over a minor portion of the length of the heater.

6. The combination of a runner plate assembly and a heating element for an injection molding machine, including a runner plate comprised by a backing plate and a facing plate arranged in intimate face contact, the runner plate having a plurality of runner cavities provided by grooves between the juxtaposed faces of the backing and facing plates and bores in the facing plate connecting with said grooves, the runner cavities having a common supply aperture in the back plate through which plasticized molding material under pressure may be forced through the runner cavities and out through a discharge aperture of the facing plate, and a tubular heat-producing electrical element within each runner cavity and of sufficient length for the element to extend substantially throughout the length of the associated runner cavity, the element being of a major transverse cross-section less than the complementary transverse cross-section of the associated runner cavity for the outer surface of the element to be spaced from the cavity defining walls to provide for the passage of plasticized molding material along the outer surface of said element between said supply and discharge apertures, one end of each heater terminating at the discharge aperture of the associated runner cavity in a hemispherical end surface overlying said discharge aperture, the hemispherical end surface including at least one groove which passes through the longitudinal axis of the heater and which extends over a minor portion of the length of the heater, and a connection box secured to the element adjacent an opposite end thereof and positioned within the supply aperture of the runner.

References Cited in the file of this patent

UNITED STATES PATENTS

| | | |
|---|---|---|
| 959,233 | Lanum | May 24, 1910 |
| 1,920,629 | Chevassus | Aug. 1, 1933 |
| 1,927,570 | Lofthouse | Sept. 19, 1933 |
| 2,118,415 | Pesark | May 24, 1938 |
| 2,735,922 | Johnson | Feb. 21, 1956 |
| 2,770,011 | Kelly | Nov. 13, 1956 |
| 2,864,929 | Schwing | Dec. 16, 1958 |
| 2,871,515 | Loew | Feb. 3, 1959 |

FOREIGN PATENTS

| | | |
|---|---|---|
| 586,125 | Germany | Oct. 17, 1933 |